United States Patent
Figura et al.

(10) Patent No.: US 11,318,989 B2
(45) Date of Patent: May 3, 2022

(54) STEERING MECHANISM WITH HAPTIC FEEDBACK

(71) Applicant: FORD GLOBAL TECHNOLOGIES, LLC, Dearborn, MI (US)

(72) Inventors: Michael Georg Figura, Dormagen (DE); Alexander Ein Waldt, Cologne (DE); Armin Schymczyk, Solingen (DE)

(73) Assignee: Ford Global Technologies, LLC, Dearborn, MI (US)

(*) Notice: Subject to any disclaimer, the term of this patent is extended or adjusted under 35 U.S.C. 154(b) by 768 days.

(21) Appl. No.: 16/248,405

(22) Filed: Jan. 15, 2019

(65) Prior Publication Data

US 2019/0217885 A1    Jul. 18, 2019

(30) Foreign Application Priority Data

Jan. 15, 2018 (DE) ..................... 10 2018 200 523.0

(51) Int. Cl.
*B62D 6/00* (2006.01)
*B62D 5/04* (2006.01)
(Continued)

(52) U.S. Cl.
CPC .............. *B62D 6/008* (2013.01); *B60Q 9/00* (2013.01); *B62D 5/006* (2013.01); *B62D 5/0415* (2013.01);
(Continued)

(58) Field of Classification Search
CPC .... B62D 6/008; B62D 15/021; B62D 5/0415; H02K 7/003
See application file for complete search history.

(56) References Cited

U.S. PATENT DOCUMENTS 4,830,127 A     5/1989   Ito et al.
5,090,261 A *   2/1992   Nakatsukasa ............. B60S 1/08
                                                 384/610

(Continued)

FOREIGN PATENT DOCUMENTS

DE      10034135 C1    10/2001
DE      10159330 A1    7/2002

OTHER PUBLICATIONS

DE Examination Report DE 10 2018 200 523.0 filed Sep. 2, 2019, 5 pages.

*Primary Examiner* — Tony H Winner
(74) *Attorney, Agent, or Firm* — Raymond L. Coppiellie; Brooks Kushman P.C.

(57) ABSTRACT

A steering mechanism for simulating a haptic feedback steering sensation includes a steering shaft connected to a steering wheel. An angle measuring device is arranged on the steering shaft and measures a rotation angle that is prevailing at the steering wheel the steering mechanism further includes an electric motor arranged in a coaxial manner with respect to the steering shaft. The electric motor is configured to apply a torque to the steering shaft. The direction of rotation of the torque applied by the electric motor is usually oriented in the opposite direction to the direction of rotation of the rotation angle that is prevailing at the steering wheel. Furthermore, the magnitude of the torque is dependent upon the value of the rotation angle and upon the vehicle model that is used as a basis. The electric motor is connected to the steering shaft via a torsionally elastic coupling.

20 Claims, 3 Drawing Sheets

(51) Int. Cl.
    *B62D 15/02*          (2006.01)
    *H02K 7/00*           (2006.01)
    *B60Q 9/00*           (2006.01)
    *H02K 7/108*         (2006.01)
    *H02K 11/215*        (2016.01)
    *H02K 1/00*           (2006.01)
    *H02K 5/16*           (2006.01)
    *H02K 1/30*           (2006.01)
    *B62D 5/00*          (2006.01)

(52) U.S. Cl.
    CPC ............ *B62D 15/021* (2013.01); *H02K 1/00* (2013.01); *H02K 1/30* (2013.01); *H02K 5/161* (2013.01); *H02K 7/003* (2013.01); *H02K 7/108* (2013.01); *H02K 11/215* (2016.01)

(56) References Cited

U.S. PATENT DOCUMENTS

| | | | | |
|---|---|---|---|---|
| 6,079,513 | A * | 6/2000 | Nishizaki | B62D 5/006 180/402 |
| 6,834,261 | B1 | 12/2004 | Andonian | |
| 9,683,639 | B2 * | 6/2017 | Kogure | B62D 5/0415 |
| 9,988,073 | B2 * | 6/2018 | Shiina | B62D 5/0415 |
| 2004/0238257 | A1 * | 12/2004 | Takahashi | B62D 6/008 180/402 |
| 2006/0047391 | A1 * | 3/2006 | Katou | B62D 5/006 701/41 |
| 2015/0329141 | A1 * | 11/2015 | Preijert | B62D 6/04 701/41 |

\* cited by examiner

STEERING MECHANISM WITH HAPTIC FEEDBACK

CROSS-REFERENCE TO RELATED APPLICATIONS

This application claims foreign priority benefits under 35 U.S.C. § 119(a)-(d) to DE Application 10 2018 200 523.0 filed Jan. 15, 2018, which is hereby incorporated by reference in its entirety.

TECHNICAL FIELD

The present invention relates to a steering mechanism for simulating a haptic feedback steering sensation.

BACKGROUND

The procedure of steering a motor vehicle has hitherto always been an elementary component of guiding a motor vehicle. However, the current development of the motor vehicle is moving in a direction in which a mechanical connection between the steering wheel and the wheels that are to be steered appears outdated. Until May 2008, it was obligatory to install a mechanical connection between the steering wheel and the wheels that are to be steered. The absence of the mechanical connection introduces concepts that are described as "steer-by-wire". Under these conditions, the driver of the motor vehicle that is making steering inputs does not receive any haptic feedback regarding the steering procedure. Consequently, it is more difficult for the driver to assess whether the motor vehicle is being correctly steered, over-steered or under-steered. Although the visual perception of the driver and the manner in which the centrifugal forces are perceived by the driver while making steering inputs may assist the driver to correctly assess the situation, it is above all the haptic feedback received by the driver through his/her hands and/or arms while making steering inputs that provides a sensitivity feeling regarding the control of a motor vehicle.

U.S. Pat. No. 6,834,261 B1 discloses a system for simulating a steering wheel sensation in a motor vehicle, in a laboratory simulator or in an entertainment device. In so doing, the system comprises a disk servo motor that is configured so as to transmit to the steering wheel a torque that is dependent upon the condition of the road and thus to simulate a steering sensation that is dependent upon the condition of the road. Moreover, U.S. Pat. No. 4,830,127 describes a device and a method for simulating a steering wheel sensation with the aid of a vehicle model.

SUMMARY

The present invention discloses a steering mechanism for simulating a haptic feedback steering sensation. The steering mechanism comprises a steering shaft that is connected to a steering wheel. An angle measuring device is arranged on the steering shaft. This angle measuring device measures a rotation angle of the steering wheel as it is turned by a driver of the vehicle when steering inputs are made. Said angle measuring device may comprise a magnet ring, a device for registering the number of magnets in the magnet ring that move past a sensor, and a device for detecting the direction in which the steering wheel is rotating. Furthermore, the steering mechanism comprises an electric motor that is arranged in a coaxial manner with respect to the steering shaft. The electric motor that may be in particular a servo motor is configured so as to apply a torque to the steering shaft. The direction of rotation of the torque that is applied by the electric motor is usually in the opposite direction to the direction of rotation of the rotation angle that is prevailing at the steering wheel. Furthermore, the magnitude of the torque is dependent upon the value of the rotation angle and upon the vehicle model that is being used as a basis. Moreover, the magnitude may be dependent upon further parameters, in particular on the vehicle velocity and lateral acceleration. In accordance with the invention, the electric motor is connected to the steering shaft via a torsionally elastic coupling.

As a result of the electric motor being connected to the steering shaft via a torsionally elastic coupling, the simulation of the haptic feedback steering sensation is subjected to only a few torque ripples. The limited number of coils and magnets in the electric motor may cause the applied torque to pulsate. Without the provision of the elastic coupling, this could lead to perceptible torque ripples. The torsionally elastic coupling between the electric motor and the steering shaft causes the rotor to rotate more smoothly with respect to the stator and thus leads to a reduction in the extent to which the torque pulsates. Consequently, the torsionally elastic coupling produces an extensively ripple-free steering sensation (by way of example in the case of a sporty driving behavior, a normal or comfortable driving behavior).

In accordance with one embodiment, the torsionally elastic coupling may be a rubber ring or in accordance with a further embodiment, said torsionally elastic coupling may be configured from spring stacks that are arranged in a radial manner with respect to one another.

The steering mechanism comprises in accordance with one embodiment a torque measuring device. This torque measuring device is arranged on the steering shaft. The torque measuring device is configured so as to measure a torque that is applied to the steering shaft and is applied by the electric motor.

In accordance with a further embodiment of the present invention, the torque measuring device is completely integrated into the steering mechanism. For this purpose, the steering shaft of the steering mechanism comprises a first shaft that is connected to the steering wheel, and a second shaft that is connected to the electric motor, wherein the first shaft is connected to the second shaft via a torsion bar spring. The torque measuring device comprises in this case a device for ascertaining the relative angle by which the second shaft is rotated with respect to the first shaft, and a calculating unit that with reference to the characteristic variables of the torsion bar spring uses the ascertained relative angle to calculate the magnitude of torque that is acting between the first shaft and the second shaft. The device for ascertaining the relative angle may comprise in this case by way of example a first annular magnet ring and a second annular magnet ring. The first magnet ring is connected in a coaxial manner to the first shaft, and the second magnet ring is connected in a coaxial manner to the second shaft. Moreover, the device for ascertaining the relative angle comprises a device for ascertaining the relative rotation of the first magnet ring with respect to the second magnet ring, which then represents the relative angle by which the second shaft rotates with respect to the first angle. In accordance with a further embodiment of the invention, the torque measuring device having such a device for ascertaining the relative angle may also assume the function of the angle measuring device that measures the rotation angle that is prevailing at the steering wheel.

In accordance with a further embodiment, the steering mechanism is kept very compact. This is achieved as a result of arranging the stator of the electric motor opposite the rotor of the electric motor in the radial direction.

Furthermore, in accordance with a further embodiment, the rotor of the electric motor is configured in a disk-shaped manner. The sensor and the control unit for the motor are arranged in this embodiment on a circuit board that is configured in a disk-shaped manner and also is arranged in a coaxial manner with respect to the steering shaft. In addition, a spacing in the axial direction between the circuit board and the rotor is smaller than the radius of the rotor. The construction is extremely compact as a result of arranging the elements in this manner.

In accordance with a further embodiment, the steering mechanism comprises a control unit having at least one field effect transistor (FET) that is arranged on the radially outer edge of the circuit board. The FET is responsible for the control of current flow in the coil of the electric motor, said coil being allocated to the FET. In the event that the radius of the circuit board is almost identical to the radius of the electric motor and the axial spacing between the circuit board and the electric motor is small in accordance with the previous embodiment, this arrangement produces an extremely small spacing between the FET and the associated coil. As a consequence, on the one hand interference that is acting on the connections that lie between the coil and the FET are reduced and on the other hand heat losses are reduced. A short transmission distance between the FET and the associated coil is consequently advantageous.

Further features, characteristics and advantages of the present invention are disclosed in the description below of an exemplary embodiment with reference to the attached figures.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

One exemplary embodiment of a steering mechanism for simulating a haptic feedback steering sensation is described below with reference to the figures.

Figure 1:
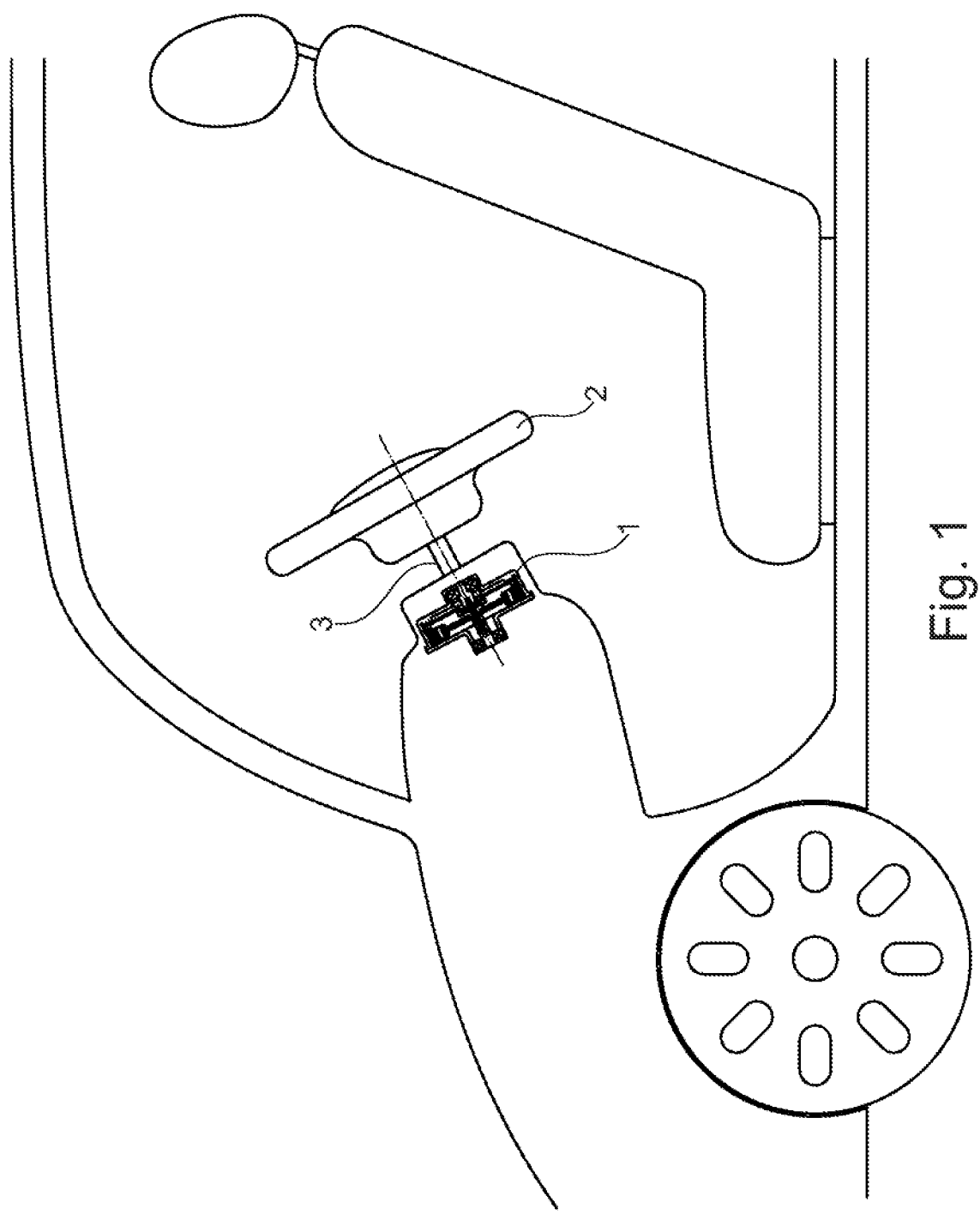
FIG. 1 illustrates a motor vehicle having a steering mechanism in accordance with the invention.

The present exemplary embodiment demonstrates a steering mechanism 1 in accordance with the invention in a motor vehicle (see FIG. 1). The steering mechanism 1 comprises a steering shaft 3 that is connected to a steering wheel 2. The steering shaft 3 in the present exemplary embodiment is subdivided into a first shaft 12 and a second shaft 13. The two shafts 12, 13 are connected to one another via a torsion bar spring 14. Furthermore, the two shafts 12, 13 are mounted in such a manner that the two shafts 12, 13 are able to rotate with respect to one another. It is necessary to apply a specified magnitude of torque in order to achieve a specified rotation angle of the rotating procedure. This torque is dependent upon the shear modulus and the diametrically opposite area moment of inertia of the torsion bar spring 14. The prevailing torque may thus be ascertained from the rotation angle if the values of the shear modulus and the area moment of inertia of the torsion bar spring 14 are known. It is therefore possible for the torsion bar spring 14 together with a device for measuring the angle about which the shafts 12, 13 are rotated with respect to one another to form a torque measuring device.

Figure 3:
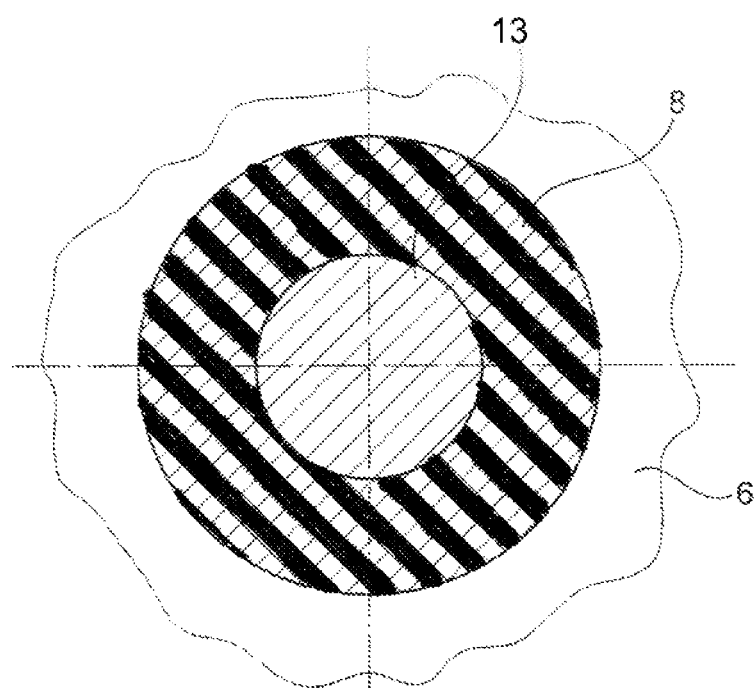
FIG. 3 illustrates a cross section of the steering shaft and of the rotor of the simulation rotor in the region of the torsionally elastic coupling.

The first shaft 12 is connected to the steering wheel 2. The second shaft 13 is connected to an electric motor 5. In accordance with the invention, the rotor 6 of the electric motor 5 is thus connected via a torsionally elastic coupling 8 to the second shaft 13 of the steering shaft 3. In this case, the torsionally elastic coupling 8 may be for example a rubber ring or may be configured from spring stacks that are arranged in a radial manner with respect to one another, see FIG. 3.

The torsionally elastic coupling 8 between the rotor 6 of the electric motor 5 and the second shaft 13 of the steering shaft 3 is primarily configured so as to smooth out the pulsation that occurs in the torque that is applied by the electric motor 5 to the second shaft 13, said pulsation being produced by the finite number of windings in the coils of the stator 7 and the finite number of magnets in the rotor 6.

The rotor 6 of the electric motor 5 is configured in a disk-shaped manner in the exemplary embodiment of the present invention. A plurality of magnets is arranged on the radially outer edge of the rotor 6. An axially compact construction is produced by virtue of arranging the magnets on the radial outer edge of the rotor 6, since as a result the stator 7 of the electric motor 5 may also be arranged in the radial direction with respect to the rotor 6. In addition to arranging the stator 7 in the radial direction with respect to the rotor 6, the stator 7 is connected in this exemplary embodiment to a housing 9 that surrounds the steering shaft 3. The housing 9 is generally cylindrical and hollow and coaxially surrounds the steering shaft 3. The housing 9 is secured against rotation relative to the vehicle as a whole. Cooling ribs (not illustrated) may be arranged on the outer surfaces of the housing 9, said cooling ribs facing radially outward so as to dissipate heat accordingly from the housing 9.

The housing 9 coaxially surrounds the two shafts 12, 13 of the steering shaft 3, the electric motor 5, and a torque measuring device. In the exemplary embodiment depicted, the torque measuring device 4 is integrated into the steering mechanism 1. For this purpose, the steering mechanism 1 comprises a first magnet ring 15 and a second magnet ring 16. The two magnet rings 15, 16 are annular in shape and are arranged in a coaxial manner with respect to the steering shaft 3. Furthermore, the two magnet rings 15, 16 are configured along their respective periphery with magnets that are arranged in an alternating manner. The first annular magnet ring 15 is connected to the first shaft 12, and the second annular magnet ring 16 is connected to the second shaft 13. The two annular magnet rings 15, 16 are arranged in such a manner that a measuring head comprising two sensors 17, 18 may be arranged between two magnet rings 15, 16. One sensor 18 is configured in such a manner that it registers magnetic field changes that relate to the movement of the magnets of the first magnet ring 15 past the sensor 18. Because of this arrangement of the magnets in the magnet ring, the sensor 18 registers pulse-shaped magnetic field changes as the first shaft 12 rotates, wherein each pulse corresponds to a magnet and a specified rotation angle that is dependent upon the number of magnets on the magnet ring. Using a counting circuit that is able to count the number of pulses, and a device that is used to detect the direction of rotation of the first shaft 12, it is subsequently possible to ascertain the rotation angle and the direction of rotation of the first shaft 12, from which the steering wheel angle that is adopted by the driver is derived.

The other sensor 17 is configured in such a manner that it registers magnetic field changes that relate to the movement of the magnets of the second magnet ring 16 past the sensor 17. Due to an arrangement of the individual magnets of the magnet ring, the sensor 17 registers pulse-shaped magnetic field changes as the second shaft 13 rotates, wherein each pulse corresponds to a magnet and a specified rotation angle that is dependent upon the number of magnets on the magnet ring. Using a counting circuit that is able to count the number of pulses, and a device that is used to detect the direction of rotation of the second shaft 13, it is subsequently possible to ascertain the rotation angle and the direction of rotation of the second shaft 13. Using the difference between the rotation angle of the first shaft 12 and the rotation angle of the second shaft 13, it is possible by taking into consideration the algebraic sign of the two rotation angles to ascertain the relative rotation of the first shaft 12 with respect to the second shaft 13, from which it is possible, based on the knowledge of the values of the shear modulus and the diametrically opposite area moment of inertia of the torsion bar spring 14, to derive the magnitude of torque that is acting between the two shafts. In the present case, the torque is ascertained with the aid of an electronic control circuit serving as an evaluating unit.

The torque measuring device is configured in particular so as to provide feedback regarding the torque that is applied by the electric motor 5 to the second shaft 13. The feedback renders it possible for the torque that the driver is able to sense at the steering wheel to be reliably controlled to produce a desired torque that is calculated on the basis of the adopted steering wheel angle. It is also possible when calculating the magnitude of the desired torque to base the calculation on still further parameters, such by way of example the vehicle velocity, in addition to the adopted steering wheel angle. If in addition the condition of the road surface is identified, it is possible to derive therefrom a coefficient of friction that may likewise be used when calculating the magnitude of the desired torque value. It is possible by virtue of specifying different calculation rules for the desired torque values to generate different steering sensations, by way of example a sport, a comfortable or a normal steering sensation.

The sensor 17 and also the evaluating unit for the torque measuring device may be arranged on a single circuit board 10. In the present exemplary embodiment, this circuit board 10 is configured in an annular manner and is arranged in a coaxial manner with respect to the steering shaft 3. In a similar manner to the stator 7, the circuit board in the present exemplary embodiment is fastened to the housing 9. The axial spacing between the circuit board 10 and the disk-shaped rotor 6 of the electric motor 5 is smaller than the radius of the rotor 6.

Figure 2:
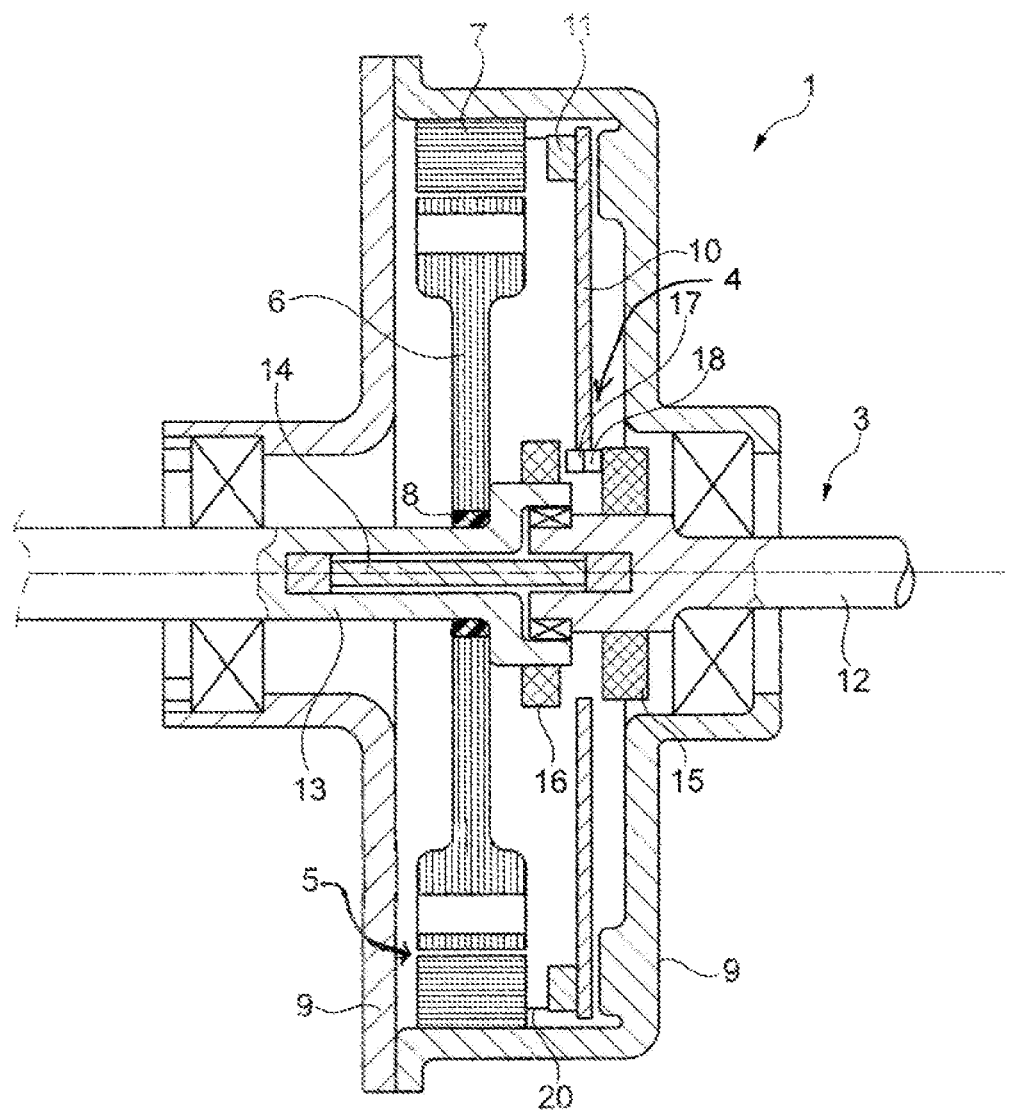
FIG. 2 illustrates an exemplary embodiment of the steering mechanism in accordance with the invention.

The stator 7 comprises at least one electrical coil which is supplied with electrical current in a manner well known in the art. The supply of current may, for example, be controlled in an open-loop manner via at least one FET 11. The number of FETs usually corresponds to the number of coils in the electric motor. The at least one FET 11 may advantageously be located on the circuit board 10. In order to ensure that the transmission distance 20 between the FET 11 and the associated coil is short, the at least one FET 11 is located at or near the radial outer edge of the circuit board 10, in other words in the region in which the circuit board 10 is fastened to the housing 9. A prerequisite for a short transmission distance 20 is further that the axial spacing between the circuit board and the disk-shaped electric motor is small. This is the case in the present exemplary embodiment, as is evident in FIG. 2. As a result, interferences that act on the connection are reduced and any heat losses that occur are reduced.

The present invention has been described with reference to an exemplary embodiment for explanation purposes. However, a person skilled in the art recognizes that deviations from the exemplary embodiment are possible and it is possible to deviate from the exemplary embodiment. The invention is therefore not to be limited to the exemplary embodiment but merely by the attached claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for generating haptic feedback to a steering wheel attached to a steering shaft; comprising
    an angle measuring device disposed on the steering shaft and operative to detect a rotation of the steering wheel;
    an electric motor having a rotor and connected coaxially to the steering shaft to apply a torque thereto;
    a control circuit operative to supply current to the electric motor such that a magnitude of the torque depends upon a magnitude of the rotation and upon a vehicle model; and
    a torsionally elastic coupling interposed between the rotor and the steering shaft.

2. The apparatus of claim 1, wherein the torsionally elastic coupling is a rubber ring.

3. The apparatus of claim 1, wherein the angle measuring device comprises:
    a magnet ring comprising a plurality of magnets secured to the steering shaft; and
    a sensor operative to detect passage of individuals magnets of the plurality.

4. The apparatus of claim 1, further comprising a torque measuring device arranged on the steering shaft and operative to measure the torque that is applied by the electric motor.

5. The apparatus of claim 4, wherein the torque measuring device utilizes an input from the angle measuring device.

6. The apparatus of claim 4, wherein:
    the steering shaft comprises a first shaft connected to the steering wheel, and a second shaft connected to the electric motor, the first and second shafts connected by a torsion bar spring and
    the torque measuring device comprises a device for detecting an angle-of-rotation of the second shaft relative to the first shaft, and further comprises a calculating unit operative to calculate a magnitude of torque acting between the first and second shafts based on characteristic variables of the torsion bar spring and the angle-of-rotation.

7. The apparatus of claim 6, wherein the device for ascertaining the angle-of-rotation comprises:
a first annular magnet ring connected coaxially to the first shaft;
a second annular magnet ring connected coaxially to the second shaft; and
means for ascertaining a relative rotation of the first magnet ring with respect to the second magnet ring.

8. An apparatus for generating haptic feedback to a steering wheel attached to a steering shaft; comprising
an angle measuring device disposed on the steering shaft and operative to detect a magnitude of rotation of the steering wheel;
an electric motor having a rotor connected coaxially to the steering shaft to apply a torque thereto, wherein a magnitude of the torque is dependent at least upon the magnitude of rotation; and
a torsionally elastic coupling interposed between the rotor and the steering shaft.

9. The apparatus of claim 8, wherein the torsionally elastic coupling is a rubber ring.

10. The apparatus of claim 8, wherein the angle measuring device comprises:
a magnet ring comprising a plurality of magnets secured to the steering shaft; and
a sensor operative to detect passage of individuals magnets of the plurality.

11. The apparatus of claim 8, further comprising a torque measuring device arranged on the steering shaft and operative to measure the torque that is applied by the electric motor.

12. The apparatus of claim 11, wherein:
the steering shaft comprises a first shaft connected to the steering wheel, and a second shaft connected to the electric motor, the first and second shafts connected by a torsion bar spring and
the torque measuring device comprises a device for detecting an angle about which the second shaft is rotated relative to the first shaft, and further comprises a calculating unit operative to calculate a magnitude of torque acting between the first and second shafts based on characteristic variables of the torsion bar spring and the detected angle.

13. The apparatus of claim 12, wherein the device for detecting the angle comprises:
a first annular magnet ring connected coaxially to the first shaft;
a second annular magnet ring connected coaxially to the second shaft; and
means for ascertaining relative rotation of the first magnet ring with respect to the second magnet ring.

14. An apparatus for generating haptic feedback to a steering wheel attached to a steering shaft; comprising:
an angle measuring device operative to detect a rotation of the steering wheel;
an electric motor having a rotor and connected coaxially to the steering shaft to apply a torque thereto in response to the rotation; and
a torsionally elastic coupling interposed between the rotor and steering shaft.

15. The apparatus of claim 14, wherein the angle measuring device comprises:
a magnet ring comprising a plurality of magnets secured to the steering shaft; and
a sensor operative to detect passage of individuals magnets of the plurality.

16. The apparatus of claim 14, further comprising a torque measuring device arranged on the steering shaft and operative to measure the torque that is applied by the electric motor.

17. The apparatus of claim 16, wherein:
the steering shaft comprises a first shaft connected to the steering wheel, and a second shaft connected to the electric motor, the first and second shafts connected by a torsion bar spring and
the torque measuring device comprises a device for detecting an angle-of-rotation of the second shaft relative to the first shaft, and further comprises a calculating unit operative to calculate a magnitude of torque acting between the first and second shafts based on characteristic variables of the torsion bar spring and the angle-of-rotation.

18. The apparatus of claim 17, wherein the device for detecting the angle-of-rotation comprises a first annular magnet ring and a second annular magnet ring, wherein the first magnet ring is connected in a coaxial manner to the first shaft and the second magnet ring is connected in a coaxial manner to the second shaft, and a device for ascertaining relative rotation of the first magnet ring with respect to the second magnet ring.

19. The apparatus of claim 16, wherein
the torque measuring device comprises a circuit board coaxially surrounding the steering shaft.

20. The apparatus of claim 19, further comprising at least one field effect transistor disposed on a radially outer edge of the circuit board and operative to control a magnitude of current supplied to the electric motor.

* * * * *